United States Patent
Ikemoto

(10) Patent No.: US 9,185,028 B2
(45) Date of Patent: Nov. 10, 2015

(54) WIRELESS COMMUNICATION APPARATUS, A COMPUTER-READABLE RECORDING MEDIUM AND WIRELESS COMMUNICATION METHOD

(71) Applicant: FUJITSU LIMITED, Kawasaki-shi, Kanagawa (JP)

(72) Inventor: Kentaro Ikemoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 252 days.

(21) Appl. No.: 13/633,443

(22) Filed: Oct. 2, 2012

(65) Prior Publication Data

US 2013/0163514 A1    Jun. 27, 2013

(30) Foreign Application Priority Data

Dec. 26, 2011   (JP) ................... 2011-283922

(51) Int. Cl.

| | | |
|---|---|---|
| H04W 40/24 | (2009.01) | |
| H04W 40/12 | (2009.01) | |
| H04W 84/18 | (2009.01) | |
| H04L 29/06 | (2006.01) | |
| H04L 12/741 | (2013.01) | |

(52) U.S. Cl.
CPC ............... *H04L 45/54* (2013.01); *H04W 40/12* (2013.01); *H04W 40/248* (2013.01); *H04L 69/22* (2013.01); *H04W 84/18* (2013.01)

(58) Field of Classification Search
USPC .......................................... 370/328
See application file for complete search history.

(56) References Cited

U.S. PATENT DOCUMENTS

| | | | |
|---|---|---|---|
| 2003/0117985 A1* | 6/2003 | Fujii et al. ...................... 370/328 |
| 2003/0198190 A1* | 10/2003 | Rajan et al. .................... 370/252 |
| 2004/0008691 A1* | 1/2004 | Winter et al. ............ 370/395.31 |
| 2004/0258064 A1* | 12/2004 | Nakamura et al. ............ 370/389 |
| 2005/0266841 A1* | 12/2005 | Lee ................................. 455/423 |
| 2006/0152477 A1* | 7/2006 | Noda et al. ..................... 345/156 |
| 2007/0111735 A1* | 5/2007 | Srinivasan et al. ......... 455/456.1 |
| 2007/0129008 A1* | 6/2007 | Shi et al. ....................... 455/11.1 |
| 2007/0153716 A1* | 7/2007 | Fukuzawa et al. ............ 370/315 |
| 2007/0165581 A1* | 7/2007 | Mehta et al. .................. 370/338 |
| 2007/0195702 A1* | 8/2007 | Yuen et al. .................... 370/238 |
| 2008/0019289 A1* | 1/2008 | Monden et al. ............... 370/254 |
| 2008/0056196 A1* | 3/2008 | Ito et al. ........................ 370/331 |
| 2008/0151849 A1* | 6/2008 | Utsunomiya et al. ......... 370/338 |
| 2008/0181101 A1* | 7/2008 | Oh et al. ....................... 370/218 |
| 2008/0219185 A1* | 9/2008 | Zou et al. ...................... 370/254 |
| 2008/0310340 A1* | 12/2008 | Isozu ............................. 370/328 |
| 2009/0003260 A1* | 1/2009 | Guo et al. ..................... 370/315 |
| 2009/0052321 A1* | 2/2009 | Kamath ........................ 370/235 |
| 2009/0109901 A1* | 4/2009 | Kondo et al. ................. 370/328 |

(Continued)

FOREIGN PATENT DOCUMENTS

JP    2007-235719    9/2007

*Primary Examiner* — Jenee Williams
(74) *Attorney, Agent, or Firm* — Staas & Halsey LLP

(57) ABSTRACT

When receiving a hello packet, a node registers information on a control header of the hello packet in a work table. The information on the control header of the hello packet includes a plurality of sets of an address, a destination, and ΣPav of a node. The node stores information, in which a set of an address, a destination, and ΣPav of the own node from the own node to the destination is added to the information on the control header, in the control header of the hello packet and transmits the hello packet. These processes are performed by each node included in an ad-hoc network.

6 Claims, 11 Drawing Sheets

(56) References Cited

U.S. PATENT DOCUMENTS

| | | | |
|---|---|---|---|
| 2009/0154423 A1* | 6/2009 | Song et al. | 370/331 |
| 2010/0093286 A1* | 4/2010 | Noda et al. | 455/67.11 |
| 2010/0097924 A1* | 4/2010 | Yamaguchi et al. | 370/229 |
| 2011/0044169 A1* | 2/2011 | Liu | 370/235 |
| 2012/0163367 A1* | 6/2012 | Choi et al. | 370/350 |
| 2012/0188904 A1* | 7/2012 | Koo et al. | 370/328 |
| 2013/0279362 A1* | 10/2013 | Park et al. | 370/252 |
| 2013/0329700 A1* | 12/2013 | Han et al. | 370/331 |

* cited by examiner

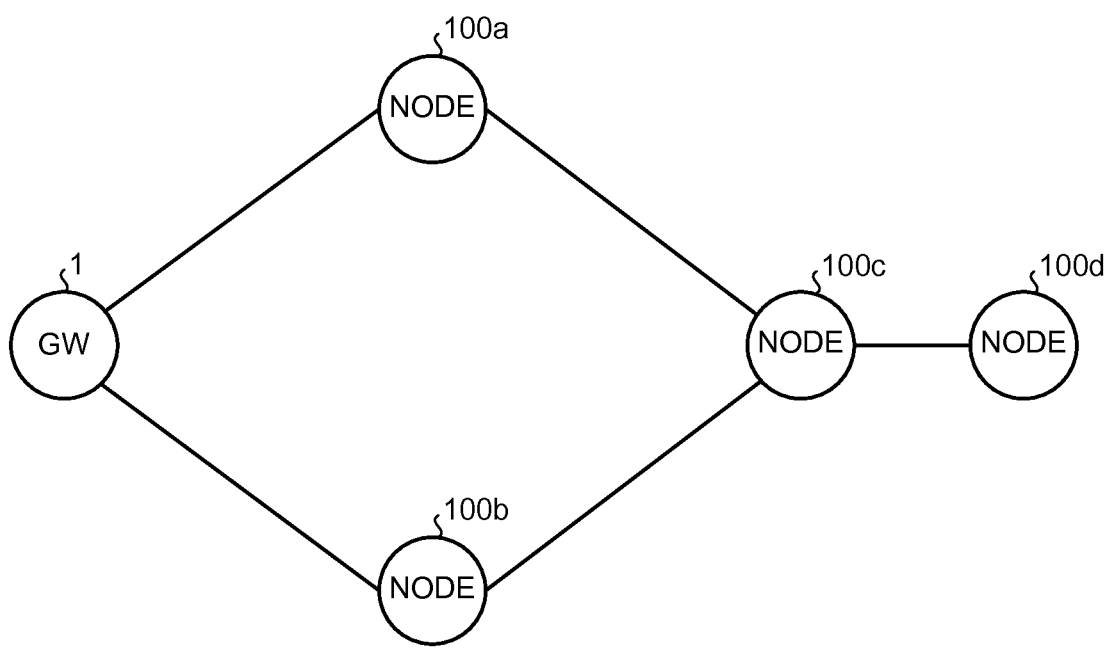

| ADDRESS, DESTINATION, Σ Pav OF NODE 100a | ADDRESS, DESTINATION, Σ Pav OF NODE 100c | ADDRESS, DESTINATION, Σ Pav OF NODE 100d | ... | ADDRESS, DESTINATION, Σ Pav OF NODE 100n |

| DESTINATION | TRANSMISSION DESTINATION | Pav | Σ Pav | Ptr | PRIORITY |
|---|---|---|---|---|---|
| GW1 | NODE 100b | 1 | 3 | 1 | 2 |
| GW1 | NODE 100a | 1 | 2 | 1 | 1 |

| DESTINATION | TRANSMISSION DESTINATION | Pav | ΣPav | Ptr | PRIORITY |
|---|---|---|---|---|---|
| GW1 | NODE 100b | 1 | 3 | 1 | 2 |
| GW1 | NODE 100a | 1 | 2 | 100 | 1 |

⇩

| DESTINATION | TRANSMISSION DESTINATION | Pav | ΣPav | Ptr | PRIORITY |
|---|---|---|---|---|---|
| GW1 | NODE 100b | 1 | 3 | 1 | 1 |
| GW1 | NODE 100a | 1 | 2 | 100 | - |

FIG.9

| | | | | |
|---|---|---|---|---|
| WORK TABLE | | | | 54a |
| ADDRESS, DESTINATION, $\Sigma$ Pav OF NODE 100a | ADDRESS, DESTINATION, $\Sigma$ Pav OF NODE 100c | ADDRESS, DESTINATION, $\Sigma$ Pav OF NODE 100d | ... | ADDRESS, DESTINATION, $\Sigma$ Pav OF NODE 100n |
| ADDRESS, DESTINATION, $\Sigma$ Pav OF NODE 100b | ADDRESS, DESTINATION, $\Sigma$ Pav OF NODE 100h | ADDRESS, DESTINATION, $\Sigma$ Pav OF NODE 100i | ... | ADDRESS, DESTINATION, $\Sigma$ Pav OF NODE 100l |
| ⋮ | ⋮ | ⋮ | | ⋮ |

FIG.10

NETWORK INFORMATION

INFORMATION ON NUMBER OF HOPS

| ADDRESS OF NODE | NUMBER OF HOPS |
|---|---|
| ADDRESS OF NODE 100a | 1 |
| ADDRESS OF NODE 100b | 1 |
| ADDRESS OF NODE 100c | 2 |
| ADDRESS OF NODE 100d | 3 |
| ... | ... |

INFORMATION ON LINK RSSI

LINK RSSI BETWEEN NODES 100a AND 100c = Pav (AC)

LINK RSSI BETWEEN NODES 100c AND 100d = Pav (CD)

...

INFORMATION ON TOPOLOGY

NODE 100a → NODE 100c → 100d → ... → 100n

NODE 100b → NODE 100h → 100i → ... → 100l

...

WIRELESS COMMUNICATION APPARATUS, A COMPUTER-READABLE RECORDING MEDIUM AND WIRELESS COMMUNICATION METHOD

CROSS-REFERENCE TO RELATED APPLICATION

This application is based upon and claims the benefit of priority of the prior Japanese Patent Application No. 2011-283922, filed on Dec. 26, 2011, the entire contents of which are incorporated herein by reference.

FIELD

The embodiment discussed herein is related to a wireless communication apparatus or the like.

BACKGROUND

In recent years, the ad-hoc network in which a plurality of wireless communication terminals are connected to each other in an autonomous distributed manner has been studied. Hereinafter, a wireless communication apparatus is simply referred to as a node. In the ad-hoc network, no access point is installed and each node transmits packets having been received from an adjacent node to a destination by relaying the packets based on communication path information.

Each node transmits information on a received signal strength indication (RSSI) by transmitting and receiving a hello packet and retains a sum value of the RSSI from the own node to a destination for each path. The RSSI indicates a signal strength. For example, the RSSI is converted into an evaluation value of a wireless link quality and used. A sum value of the evaluation values of wireless link qualities from the own node to a destination is referred to as ΣPav. When a plurality of paths destined for the destination are present, the node selects a path with a higher transmission quality with reference to ΣPav corresponding to the paths and transmits packets.

FIG. 16 is a diagram illustrating an exemplary technology of the related art. As illustrated in FIG. 16, an ad-hoc network includes a gateway (GW) 5 and nodes 10a, 10b, and 10c. Two kinds of paths, path A and path B, are present as the paths destined from the node 10c to the GW 5. When the node 10c transmits packets to the destination GW, the node 10c compares ΣPav of path A to ΣPav of path B, selects the path with a better communication quality, and transmits the packets. For example, when path A has the better communication quality, the node 10c transmits the packets to the node 10a. Then, the node 10a transmits the packets to the GW 5. An example of the related art is Japanese Laid-open Patent Publication No. 2007-235719.

The above-mentioned technology of the related art has a problem that information, such as the number of hops, a link RSSI, a topology, and the like, used to construct the paths is not efficiently collected.

Information on the number of hops, the link RSSI, the topology, and the like is used in order to save the bandwidth when the paths are constructed in the ad-hoc network. In the technology of the related art, when each piece of information is collected, each node separately transmits operation data. Therefore, the traffics increase in the ad-hoc network. Further, to obtain information on the topology, the node adds local information to the operation data when the node transmits the operation data. Therefore, the amount of data regarding the operation data increases, and thus the amount of traffic further increases.

SUMMARY

According to an aspect of an embodiment, a wireless communication apparatus includes a storage unit that stores a path information table in which a destination and a sum value of signal intensities from the own wireless communication apparatus to the destination correspond to each other; a receiving unit that receives a packet in which information on a sum value of a signal intensity of a node included in a multi-hop network and signal intensities from the node to the destination is sequentially stored for each node; and a transmitting unit that transmits a packet in which information on a sum value of a signal intensity of the own wireless communication apparatus and signal intensities from the own wireless communication apparatus to the destination is added to the information on the sum value of the signal intensity of the node and the signal intensities from the node to the destination, the information being sequentially stored for each node.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 is a diagram illustrating the configuration of an ad-hoc network according to an embodiment;

FIG. 2 is a diagram illustrating an example of the data structure of a hello packet;

FIG. 9 is a diagram illustrating an example of a work table of the GW;

FIG. 10 is a diagram illustrating an example of the data structure of network information;

DESCRIPTION OF EMBODIMENT

Figures 3, 4:
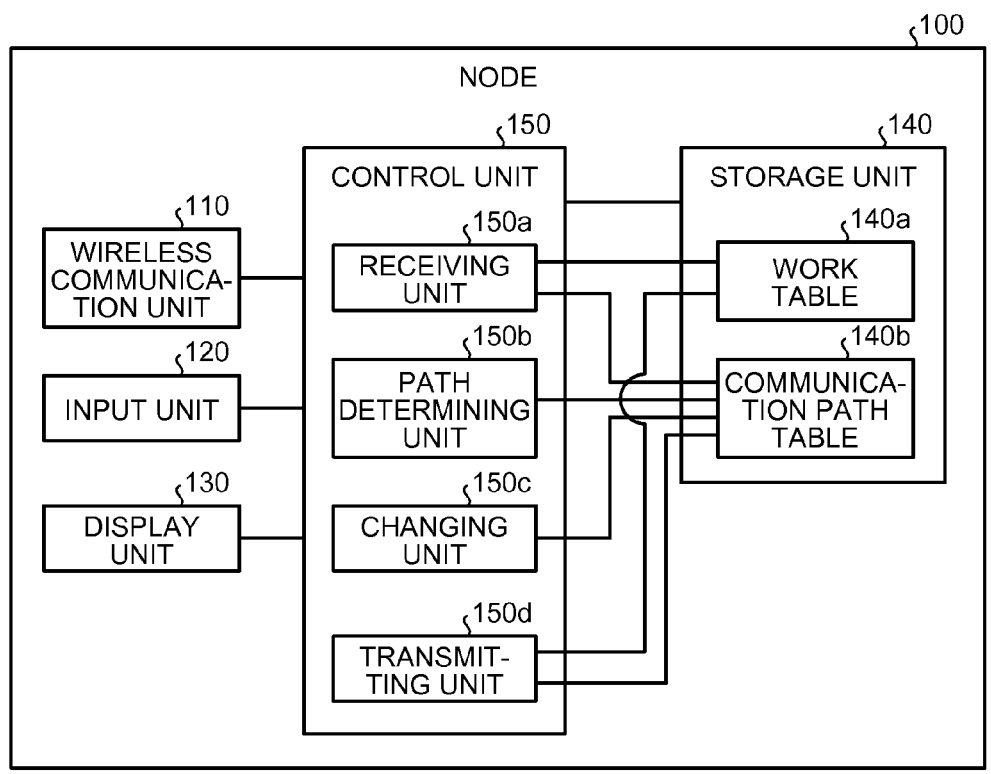
FIG. 3 is a diagram illustrating an example of the data structure of a control header.
FIG. 4 is a functional block diagram illustrating the configuration of a node.

Preferred embodiments of the present invention will be explained with reference to accompanying drawings.

However, the invention is not limited to the embodiment.

The configuration of an ad-hoc network according to the embodiment will be described. In this embodiment, for example, a case in which a single GW is used will be described. FIG. 1 is a diagram illustrating the configuration of the ad-hoc network according to this embodiment. As illustrated in FIG. 1, the ad-hoc network includes a GW 1 and nodes 100a, 100b, 100c, and 100d. The nodes 100a to 100d are examples of wireless communication terminals. Although not illustrated here, the ad-hoc network may further include other nodes.

The GW 1 and the nodes 100a to 100d are connected to adjacent nodes wirelessly. For example, the GW 1 is connected to the nodes 100a and 100b. The node 100a is connected to the GW 1 and the node 100c. The node 100b is connected to the GW 1 and the node 100c. The node 100c is connected to the nodes 100a, 100b, and 100d. The node 100d is connected to the node 100c. In the following description, the nodes 100a to 100d are collectively referred to as the nodes 100.

Each node 100 constructs communication paths by transmitting and receiving a hello packet. When each node 100 constructs the communication paths, each node 100 calculates an evaluation value using one kind of evaluation parameter among a plurality of kinds of evaluation parameters and determines the priorities of the communication paths. On the other hand, each node 100 excludes a problematic communication path depending on a situation with reference to the other evaluation parameters. Each node 100 selects the communication path with the highest priority to transmit data.

For example, each node 100 calculates evaluation values of wireless link qualities and determines the priorities of the communication paths. Further, each node 100 excludes the communication path with a network load greater than a predetermined load, and changes the priorities of the remaining communication paths. In this first embodiment, it is assumed that the higher a wireless link quality is, the smaller the evaluation value is. Further, it is assumed that the lower a network load is, the smaller the value of the network load is.

Each node 100 additionally stores the address, a destination, and ΣPav of the own node in the hello packet in correspondence therewith and transmits related information to an upstream node. For example, when it is assumed that the node 100d is a transmitting source and the GW 1 is a destination, information on the hello packet is transmitted in the sequence of the nodes 100d, 100c, 100a, and 100c, and the GW 1. The GW 1 can obtain information on the path such as the number of hops, the link RSSI, and a topology with reference to the information on the hello packet transmitted from the downstream node.

Next, the data structure of the hello packet will be described. FIG. 2 is a diagram illustrating an example of the data structure of the hello packet. As illustrated in FIG. 2, the hello packet includes a control header, a destination, a transmission destination, and ΣPav. In the hello packet, the "the control header" includes various kinds of control information. The address of a node which is a destination of a communication path is stored in "the destination." The address of a node which is a transmitting source of the hello packet is stored in the "transmission destination." A sum value of the evaluation values of the wireless link qualities from the node of the destination of the hello packet to the node of the "transmission destination" is stored in ΣPav.

A set of the address, a destination, and ΣPav of a node is stored in the control header. FIG. 3 is a diagram illustrating an example of the data structure of the control header. As illustrated in FIG. 3, "the address, the destination, and ΣPav of the node 100a" and "the address, the destination, and ΣPav of the node 100c" are stored in the control header. Further, "the address, the destination, and ΣPav of the node 100d", . . . , and "the address, the destination, and ΣPav of a node 100n" are stored in the control header.

A sum value of the evaluation values of the wireless link qualities from the GW 1 which is the destination to the node 100a is stored in ΣPav in "the address, the destination, and ΣPav of the node 100a." A sum value of the evaluation values of the wireless link qualities from the GW 1 which is the destination to the node 100c is stored in ΣPav in "the address, the destination, and ΣPav of the node 100c." A sum value of the evaluation values of the wireless link qualities from the GW 1 which is the destination to the node 100d is stored in ΣPav in "the address, the destination, and ΣPav of the node 100d." A sum value of the evaluation values of the wireless link qualities from the GW 1 which is the destination to the node 100n is stored in ΣPav in "the address, the destination, and ΣPav of the node 100n."

The set of "the address, the destination, and ΣPav of a node" stored in the control header illustrated in FIG. 3 is added in the sequence of the node 100n, . . . , the node 100d, the node 100c, and the node 100a.

Next, the configuration of the node 100 illustrated in FIG. 1 will be described. FIG. 4 is a functional block diagram illustrating the configuration of the node. As illustrated in FIG. 4, the node 100 includes a wireless communication unit 110, an input unit 120, a display unit 130, a storage unit 140, and a control unit 150.

The wireless communication unit 110 is a device that performs wireless data communication with adjacent nodes. For example, the wireless communication unit 110 corresponds to a wireless link module or the like. The control unit 150 to be described below transmits and receives a hello packet or the like to and from the adjacent nodes through the wireless communication unit 110.

The input unit 120 is an input device that inputs various kinds of information to the node 100. For example, the input unit 120 corresponds to a keyboard, a mouse, a touch panel, or the like. The display unit 130 corresponds to a display, a touch panel, or the like.

The storage unit 140 includes a work table 140a and a communication path table 140b. The storage unit 140 corresponds to a semiconductor memory element such as a random access memory (RAM), a read-only memory (ROM), or a flash memory or a storage device such as a hard disk or an optical disc.

Figures 5, 6:
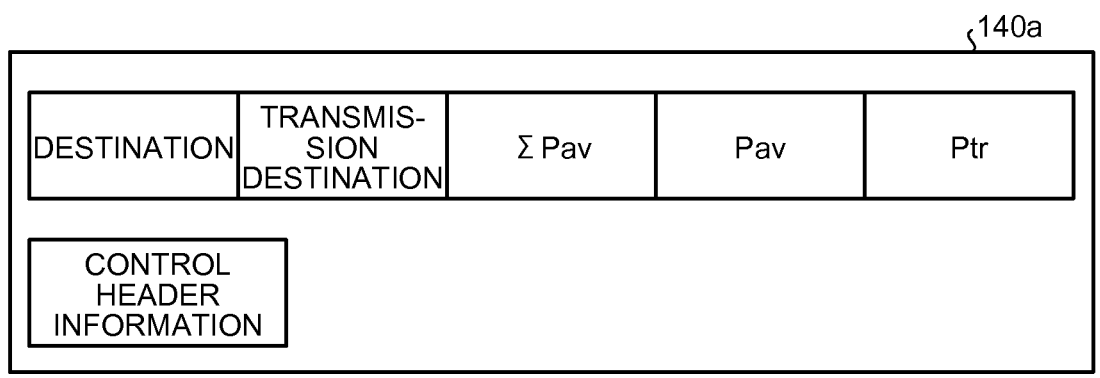
FIG. 5 is a diagram illustrating an example of the data structure of a work table of the node.
FIG. 6 is a diagram illustrating an example of the data structure of a communication path table.

The work table 140a is a table in which the information on the hello packet is temporarily stored. FIG. 5 is a diagram illustrating an example of the data structure of a work table of a node. As illustrated in FIG. 5, the work table 140a has a destination, a transmission destination, ΣPav, Pav, Ptr, and control header information. In the work table 140a, the destination and the transmission destination of the hello packet illustrated in FIG. 2 are stored as the destination and the transmission destination of the work table 140a. An average value of the wireless link qualities between the node of the transmission destination and the own node 100 is stored in Pav. A traffic load of the node of the transmission destination is stored in Ptr. A value obtained by adding the value of ΣPav of the hello packet and the value of the Pav of the work table 140a is stored in ΣPav. The information on the control header of the hello packet is stored in the control header information.

The communication path table 140b is a table in which the information on the communication paths is stored. FIG. 6 is a diagram illustrating an example of the data structure of the communication path table. As illustrated in FIG. 6, the communication path table 140b includes a destination, a transmission destination, Pav, ΣPav, Ptr, and a priority.

In FIG. 6, the destination indicates the destination of a packet. The transmission destination indicates the transmission destination when a packet is transmitted to the destination. Pav corresponds to an average value of the wireless link qualities between the node of the transmission destination and the own node 100. ΣPav is a sum value of the evaluation values of the wireless link qualities from the own node to the node of the destination. Ptr corresponds to a traffic load of the node of the transmission destination.

The priority indicates a preference of each communication path when a plurality of communication paths destined for the same destination are present. For example, two communication paths destined for the destination "GW 1" are present in FIG. 6. Specifically, the communication path destined for the destination, the "node 100b", and the communication path destined for the destination, the "node 100a" are present. Here, since the priority of the destination, the "node 100b", is "2" and the priority of the destination, the "node 100a", is "1", the communication path destined for the destination, the "node 100a", has a higher priority.

In FIG. 6, the names of the nodes are used for the destination and the transmission destination to facilitate the description, but the addresses of the nodes may be registered.

The control unit 150 includes a receiving unit 150a, a path determining unit 150b, a changing unit 150c, and a transmitting unit 150d. For example, the control unit 150 corresponds to an integrated device such as an application specific integrated circuit (ASIC) or a field programmable gate array (FPGA). For example, the control unit 150 corresponds to an electronic circuit such as a CPU or a micro processing unit (MPU).

The receiving unit 150a receives the hello packet from the adjacent node and performs various kinds of processes based on the received hello packet. The receiving unit 150a calculates the average value of the wireless link qualities between the adjacent node and the own node, when the hello packet is transmitted to and is received from the adjacent node. The receiving unit 150a detects a network load. The receiving unit 150a updates the communication path table 140b based on information included in the hello packet. The receiving unit 150a extracts the information on the control header of the hello packet in accordance with a predetermined condition and stores the extracted information in the work table 140a. Hereinafter, a sequence of processes performed by the receiving unit 150a will be described.

An example of a process performed to calculate the average value of the wireless link qualities between an adjacent node and the own node by the receiving unit 150a will be described. The receiving unit 150a has the function of the RSSI. When the receiving unit 150a receives the hello packet, the receiving unit 150a detects a reception signal intensity of the hello packet. The receiving unit 150a retains a table in which the reception signal intensities and the evaluation values correspond to each other and compares the table to the detected reception signal intensity to determine the evaluation value. The larger the reception signal intensity is, the smaller the evaluation value is. The receiving unit 150a calculates Pav by determining the evaluation value a plurality of times and calculating the average value of the evaluation values, and stores the calculated value of Pav in the work table 140a.

An example of a process performed to calculate a network load by the receiving unit 150a will be described. The receiving unit 150a retains information on the maximum communication bandwidth of an adjacent node and detects the network load based on an occupation ratio of the current communication bandwidth. The receiving unit 150a retains a table in which the occupation ratios and the values of the network loads correspond to each other, compares this table to an occupation ratio, and determines a network load. The larger the occupation ratio is, the larger the value Ptr of the network load is. The receiving unit 150a stores the detected value Ptr in the work table 140a.

An example of a process performed to update the communication path table 140b by the receiving unit 150a will be described. The receiving unit 150a first updates the work table 140a based on the hello packet. Specifically, the receiving unit 150a receives a hello packet and sets a destination included in the received hello packet as the destination of the work table 140a. The receiving unit 150a stores a value obtained by adding the value of Pav of the work table 140a to the value of ΣPav of the hello packet in ΣPav of the work table 140a. The receiving unit 150a sets the node of a transmitting source of the hello packet in the transmission destination of the work table 140a. The receiving unit 150a performs the above-described processes and ends the setting of Pav and Ptr of the work table 140a.

Then, the receiving unit 150a updates the communication path table 140b based on the work table 140a. Specifically, the receiving unit 150a sets the destination, the transmission destination, Pav, ΣPav, and Ptr included in the work table 140a in the communication path table 140b.

An example of a process performed to extract the information on the control header of the hello packet and store the extracted information in the work table 140a according to a predetermined condition by the receiving unit 150a will be described. When predetermined condition (1) is satisfied, the receiving unit 150a stores the information on the control header of the hello packet in the work table 140a.

$$\Sigma Pav(A) = \Sigma Pav(B) + Pav(C) \qquad \text{condition (1)}$$

In condition (1), ΣPav(A) corresponds to ΣPav included in a set of the address, the destination, and ΣPav of a node added to the last of the control header of the hello packet. ΣPav(B) corresponds to ΣPav of a path with a higher priority among the paths from the own node to the GW 1. Pav(C) corresponds to Pav between the node of the transmitting source of the hello packet and the own node.

The path determining unit 150b is a processing unit that sets the priority of each destination based on the communication path table 140b and determines the path of a packet.

A process performed to set the priority by the path determining unit 150b will be described. The path determining unit 150b compares the values of ΣPav for each same destination with reference to the communication path table 140b. The path determining unit 150b allocates values in ascending sequence sequentially from the priority of a record with a smaller value of ΣPav. In the example illustrated in FIG. 6, the destinations of first and second stages are identical and the value of ΣPav of the second stage is smaller than the value of ΣPav of the first stage. In this case, the path determining unit 150b sets the priority of the second stage to 1 and sets the priority of the first stage to 2.

When the path determining unit 150b receives a packet to be transmitted, the path determining unit 150b determines a transmission destination based on the priority of the communication path table 140b and transmits the packet to the node of the transmission destination. For example, when the "GW 1" is the destination of the packet, the priority of the record of the second stage is higher in the example illustrated in FIG. 6. Therefore, the path determining unit 150b transmits the packet to the node 100a.

Figures 7, 8:
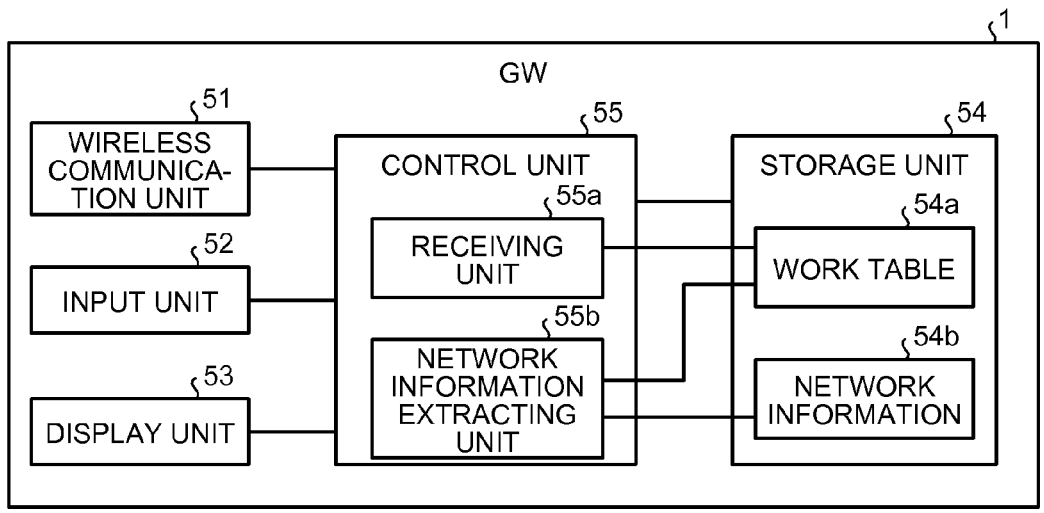
FIG. 7 is a diagram illustrating a process of a changing unit.
FIG. 8 is a functional block diagram illustrating the configuration of a GW.

The changing unit 150c is a processing unit that excludes a record with Ptr greater than a predetermined threshold value with reference to Ptr of the communication path table 140b, when Ptr is greater than the threshold value, and resets the priority. For example, the threshold value of Ptr is set to 95. FIG. 7 is a diagram illustrating a process of the changing unit. As illustrated in FIG. 7, Ptr of the second stage of the communication path table 140b is 100, and thus is greater than the threshold value. The changing unit 150c excludes the record of the second stage of the communication path table 140b and resets the priorities in ascending sequence from the smaller value of ΣPav. As illustrated in the lower part of FIG. 7, the changing unit 150c sets the priority of the record of the first stage to 1.

The transmitting unit 150d is a processing unit that generates a hello packet based on the communication path table 140b and broadcasts the hello packet. For example, the transmitting unit 150d generates the hello packet and broadcasts the hello packet each time a clock event is generated. The clock event is a signal that is periodically output from a timer mounted on the node 100.

An example of a process performed to generate the hello packet by the transmitting unit 150d will be described. The transmitting unit 150d groups records for each destination with reference to the communication path table 140b. The transmitting unit 150d sets a common destination of a group in the destination of the hello packet and sets the own node 100 in the transmission destination of the hello packet. The transmitting unit 150d generates the hello packet by setting the minimum value of ΣPav among the values of ΣPav belonging to the group in ΣPav of the hello packet. The transmitting unit 150d generates the hello packet for each group.

The transmitting unit 150d stores, in the control header of the hello packet, a result obtained by adding a set of the address, the destination, and the minimum value of ΣPav of the own node from the own node to the destination to the beginning of the control header information of the work table 140a.

When no information is stored in the communication path table 140b, the transmitting unit 150d sets the destination and the transmission destination in the own node 100 and broadcasts a hello packet in which the value of ΣPav is set to 0. For example, the transmitting unit 150d transits the hello packet each time a clock event is generated from the timer (not illustrated).

Next, the configuration of the GW 1 illustrated in FIG. 1 will be described. FIG. 8 is a functional block diagram illustrating the configuration of the GW. As illustrated in FIG. 8, the GW 1 includes a wireless communication unit 51, an input unit 52, a display unit 53, a storage unit 54, and a control unit 55.

The wireless communication unit 51 is a device that performs wireless data communication with adjacent nodes. For example, the wireless communication unit 51 corresponds to a wireless link module or the like. The control unit 55 to be described below receives a hello packet or the like from the adjacent nodes through the wireless communication unit 51.

The input unit 52 is an input device that inputs various kinds of information to the GW 1. For example, the input unit 52 corresponds to a keyboard, a mouse, a touch panel, or the like. The display unit 53 corresponds to a display, a touch panel, or the like.

The storage unit 54 includes a work table 54a and network information 54b. The storage unit 54 corresponds to a semiconductor memory element such as a RAM, a ROM, or a flash memory or a storage device such as a hard disk or an optical disc.

The work table 54a stores information included in the control header of the hello packet. FIG. 9 is a diagram illustrating an example of the work table of the GW. As illustrated in FIG. 9, a plurality of sets of the address, a destination, and ΣPav of a node included in the control header are stored in the work table 54a. In FIG. 9, the set at the left end is the finally added information and the set at the right end is the initially added information. Accordingly, the address of the set at the left end indicates the address of an adjacent node of the GW 1.

In the first stage of FIG. 9, each set of "the address, the destination, and ΣPav of the node" is added to the control header of the hello packet in the sequence of the node 100n, . . . , the node 100d, the node 100c, and the node 100a. In the second stage of FIG. 9, each set of "the address, the destination, and ΣPav of the node" is added to the control header of the hello packet in the sequence of the node 100l, . . . , the node 100i, the node 100h, and the node 100b.

The network information 54b includes information on the number of hops, a link RSSI, and a topology. FIG. 10 is a diagram illustrating an example of the data structure of the network information. As illustrated in FIG. 10, the network information 54b includes hop number information, link RSSI information, and topology information. In the hop number information, the address of a node and the number of hops from the GW 1 to this node are retained. In the link RSSI information, the evaluation value of RSSI between the nodes is retained. Further, in the link RSSI information, the very value of RSSI may be retained. In the topology information, the information on the nodes through which a packet transmitted from the node of the transmitting source to the GW is retained.

The control unit 55 includes a receiving unit 55a and a network information extracting unit 55b. For example, the control unit 55 corresponds to an integrated device such as ASIC or FPGA. Further, the control unit 55 corresponds to an electronic circuit such as a CPU or an MPU.

When the receiving unit 55a receives a hello packet from an adjacent node 100, the receiving unit 55a extracts information on the control header of the hello packet and stores the extracted information on the control header in the work table 54a. As illustrated in FIG. 3, the information on the control header includes the plurality of sets of "the address, the destination, and ΣPav of the node." The receiving unit 55a separately stores the information on the control header different in the sets of the addresses of the nodes.

The network information extracting unit 55b is a processing unit that generates the network information 54b based on the information on the control header stored in the work table 54a. The network information extracting unit 55b generates the hop number information, the link RSSI information, and the topology information.

A process performed to generate the hop number information by the network information extracting unit 55b will be described. The network information extracting unit 55b calculates the number of hops corresponding to the nodes based on the number of sets from the left end in the information on the control header of the work table 54a. For example, the node 100a is included in the first set from the left end. Therefore, the network information extracting unit 55b sets the number of hops corresponding to the address of the node 100a to "1". The node 100c is included in the second set from the left end. Therefore, the network information extracting unit 55b sets the number of hops corresponding to the address of the node 100c to "2". The network information extracting unit 55b performs this process to generate the hop number information.

A process performed to generate the link RSSI information by the network information extracting unit 55b will be described. The network information extracting unit 55b generates the link RSSI information by calculating a difference between ΣPav on the left side and ΣPav on the right side of adjacent sets in the information on the control header of the work table 54a. Hereinafter, for example, a case of calculation of the link RSSI between the nodes 100a and 100c will be described. In FIG. 9, it is assumed that ΣPav (100a) is ΣPav included in the set of "the address, the destination, and ΣPav of the node 100a". It is assumed that ΣPav (100c) is ΣPav included in the set of "the address, the destination, and ΣPav of the node 100c ".

The network information extracting unit 55b calculates the link RSSI between the nodes 100a and 100c by subtracting ΣPav (100a) from ΣPav (100c). The network information extracting unit 55b also calculates the link RSSI between the other nodes in this way. The network information extracting unit 55b performs this process to generate the link RSSI information.

A process performed to generate the topology information by the network information extracting unit 55b will be described. The network information extracting unit 55b generates the topology information by extracting the addresses of the nodes sequentially from the address of the node of the left end set in the information on the control header of the work table 54a and arranging the extracted addresses of the nodes in sequence. For example, in the first stage of FIG. 9, the addresses of the nodes 100a, 100c, 100d, . . . , and 100n are extracted in sequence. Therefore, the network information extracting unit 55b generates topology information "the node 100a→the node 100c→the node 100d→ . . . →the node 100n". The network information extracting unit 55b performs this process to generate other topology information. When the network information extracting unit 55b performs this process, topology information is generated.

Figure 11:
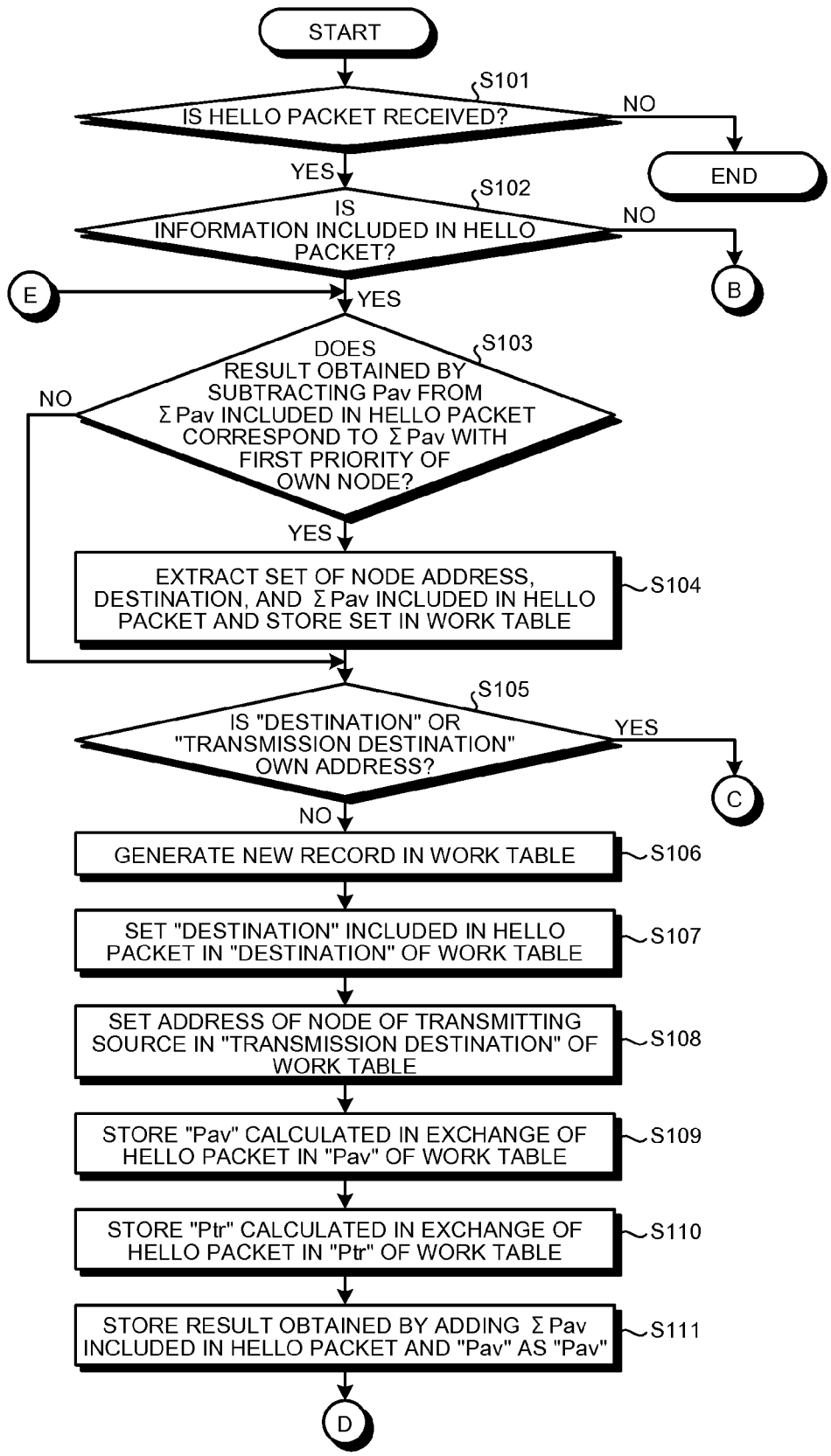
FIG. 11 is a flowchart (part 1) illustrating a processing order in which the node updates a communication path table.
Figure 12:
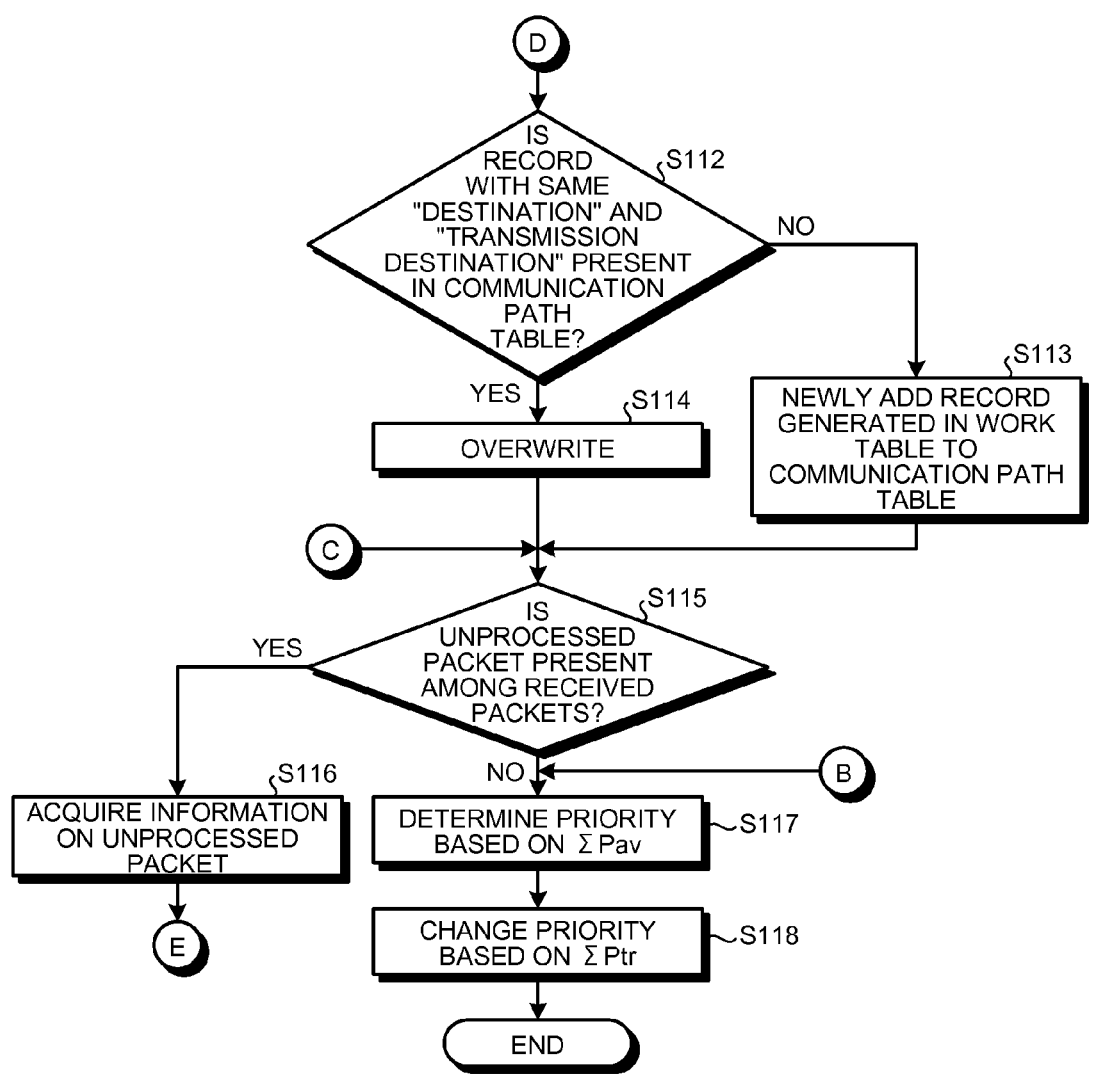
FIG. 12 is a flowchart (part 2) illustrating the processing order in which the node updates a communication path table.

Next, various processing sequences of the nodes according to this embodiment will be described. FIGS. 11 and 12 are flowcharts illustrating the processing sequence of processes performed to update the communication path table by the node. For example, the processes illustrated in FIGS. 11 and 12 start when the node receives a hello packet.

The description will be made with reference to FIG. 11. The node 100 determines whether to receive a hello packet (step S101). When the node 100 does not receive the hello packet (No in step S101), the process ends.

Conversely, when the node 100 receives the hello packet (Yes in step S101), the node 100 determines whether the information is included in the hello packet (step S102). When the information is not included in the hello packet (No in step S102), the process proceeds to step S117 in FIG. 12.

Conversely, when the information is included in the hello packet (Yes in step S102), the node 100 causes the process to proceed to step S103. When the result obtained by subtracting Pav from ΣPav included in the hello packet does not correspond to ΣPav with the first priority of the own node 100 (No in step S103), the node 100 causes the process to proceed to step S105.

When the result obtained by subtracting Pav from ΣPav included in the hello packet corresponds to ΣPav with the first priority of the own node 100 (Yes in step S103), the node 100 causes the process to proceed to step S104.

The node 100 extracts a set of the address, the destination, and ΣPav of the node included in the hello packet and stores the set in the work table 140a (step S104). The node 100 determines whether the "destination" or the "transmission destination" is the own address (step S105). When the "destination" or the "transmission destination" is the own address (Yes in step S105), the node 100 causes the process to proceed to step S115 in FIG. 12.

Conversely, when the "destination" or the "transmission destination" is not the own address (No in step S105), the node 100 generates a new record in the work table 140a (step S106). The node 100 sets the "destination" included in the hello packet in the "destination" of the work table 140a (step S107).

The node 100 sets the address of the node of the transmitting source in the "transmission destination" of the work table 140a (step S108). The node 100 stores "Pay" calculated in the exchange of the hello packet in "Pay" of the work table 140a (step S109).

The node 100 stores "Ptr" calculated in exchange of the hello packet in "Ptr" of the work table (step S110). The node 100 stores a result obtained by adding ΣPav included in hello packet and "Pay" as "Pay" (step S111).

The description will be described with reference to FIG. 12. The node 100 determines whether a node with the same "destination" and "transmission destination" is present in the communication path table 140b (step S112). When the node with the same "destination" and "transmission destination" is not present (No in step S112), the node 100 causes the process to proceed to step S113. The node 100 newly adds a record generated in the work table 140a to the communication path table 140b (step S113) and causes the process to proceed to step S115.

Conversely, when the node with the same "destination" and "transmission destination" is present (Yes in step S112), the node 100 performs overwriting (step S114) and causes the process to proceed to step S115.

The node 100 determines whether an unprocessed packet is present among the received packets (step S115). When the unprocessed packet is present (Yes in step S115), the node 100 acquires information on the unprocessed packet (step S116) and causes the process to proceed to step S103 in FIG. 11.

When the unprocessed packet is not present among the received packets (No in step S115), the node 100 determines a priority based on ΣPav (step S117). Then, the node 100 changes the priority based on Ptr (step S118).

Figure 13:
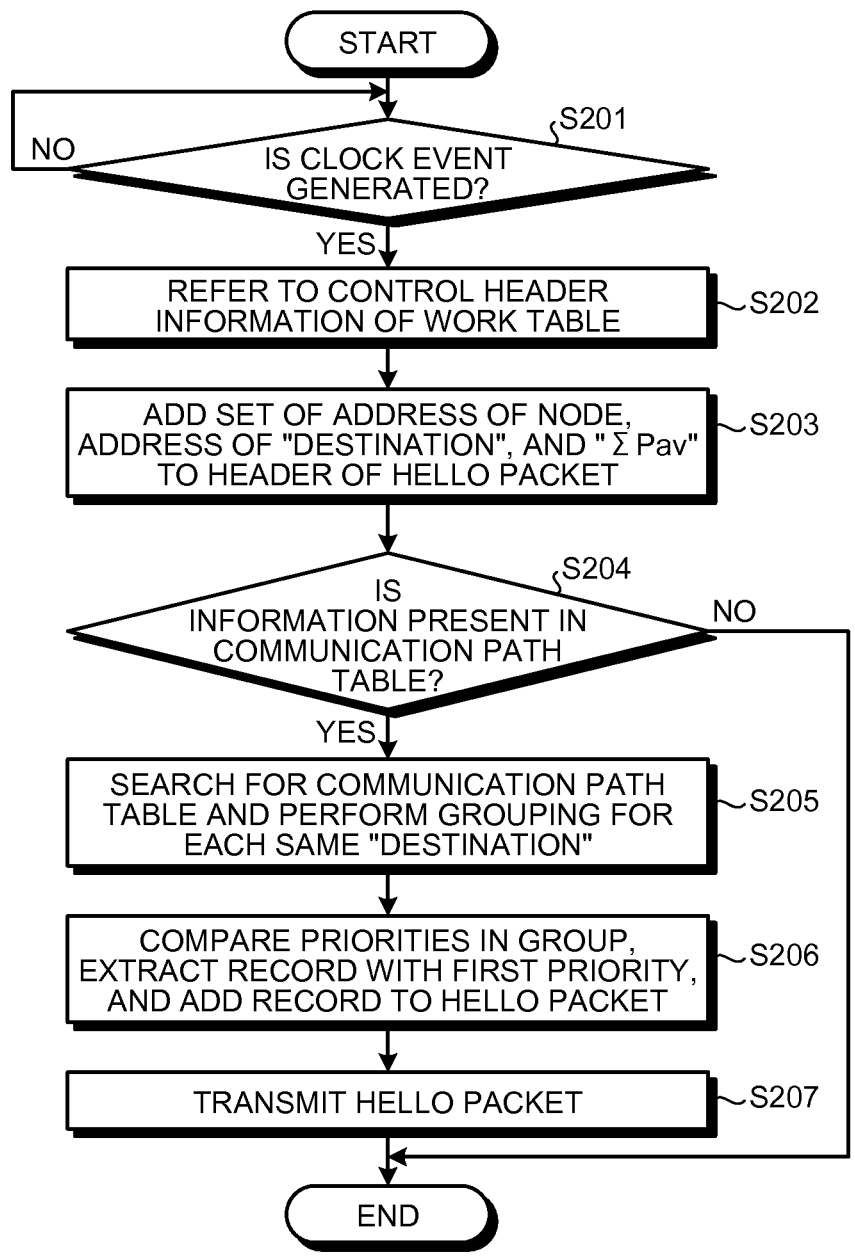
FIG. 13 is a flowchart illustrating a processing order in which the node generates a hello packet.

Next, a processing sequence in which the node 100 generates a hello packet will be described. FIG. 13 is a flowchart illustrating the processing sequence in which the node generates a hello packet. For example, a process illustrated in FIG. 13 starts when a clock event is generated.

In FIG. 13, when no clock event is generated (No in step S201), the node 100 causes the process to proceed to step S201 again. When a clock event is generated (Yes in step S201), the node 100 refers to the control header information of the work table 140a (step S202).

The node 100 adds a set of the address of the node, the address of the "destination", and "ΣPav" to the control header of the hello packet (step S203). The node 100 determines whether the information is present in the communication path table 140b (step S204). When the information is not present in the communication path table 140b (No in step S204), the node 100 causes the process to end.

When the information is present in the communication path table 140b (Yes in step S204), the node 100 searches the communication path table 140b and performs grouping for each same "destination" (step S205).

The node 100 compares the priorities in the group, extracts a record with the first priority, and adds the record with the first priority to the header of the hello packet (step S206). Then, the node 100 transmits the hello packet (step S207).

Figure 14:
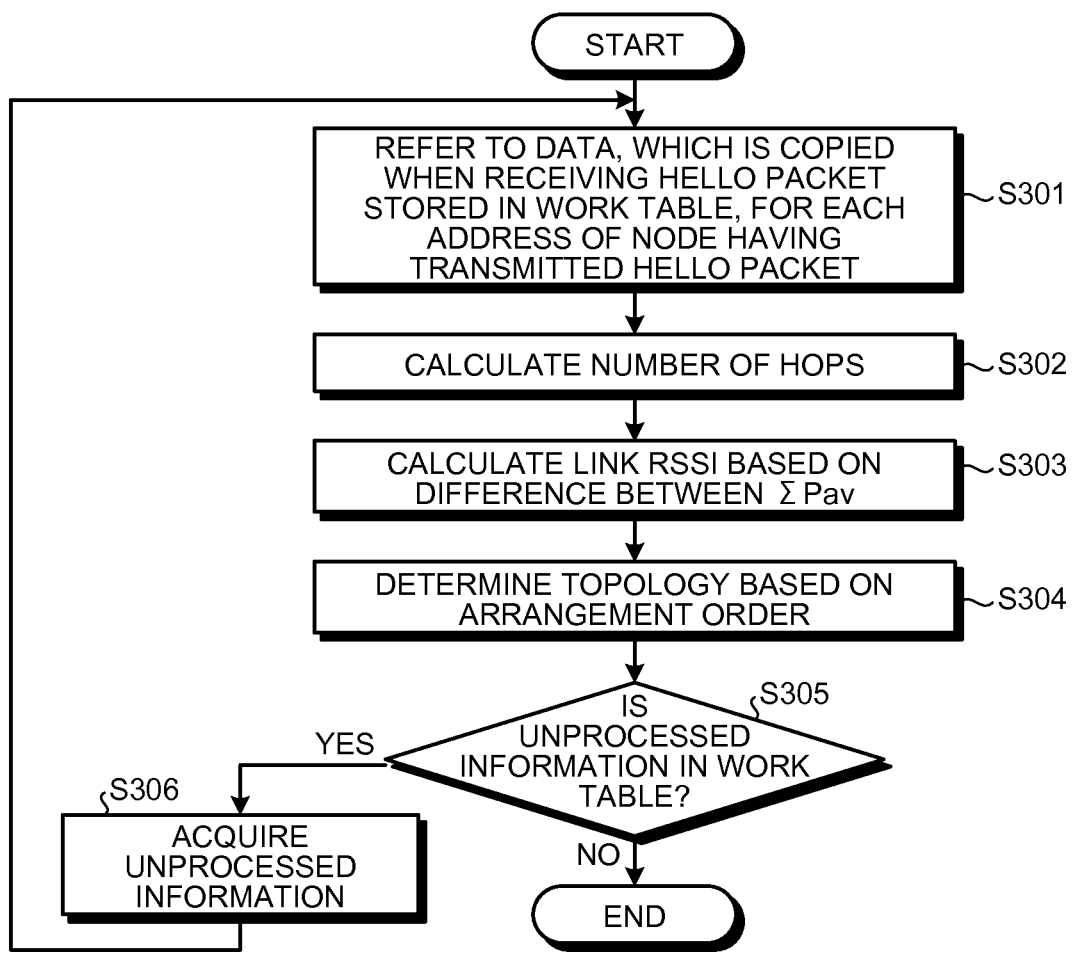
FIG. 14 is a diagram illustrating an example of a processing order of the GW.

Next, a processing sequence of processes of the GW 1 will be described. FIG. 14 is a diagram illustrating an example of the processing sequence of the GW 1. For example, the processes illustrated in FIG. 14 are performed at a predetermined time interval. As illustrated in FIG. 14, the GW 1 refers to the data, which is copied when the GW 1 receives the hello packet stored in the work table 54a, for each address of the node having transmitted the hello packet (step S301).

The GW 1 calculates the number of hops of the control header information (step S302) and calculates the link RSSI based on the difference between ΣPav (step S303). The GW 1 determines the topology based on the arrangement order of the addresses of the nodes included in the control header information (step S304).

The GW 1 determines whether unprocessed information is present in the work table 54a (step S305). When the unprocessed information is present (Yes in step S305), the GW 1 acquires the unprocessed information (step S306) and causes the process to proceed to step S301. Conversely, when the unprocessed information is not present (No in step S305), the GW 1 ends the process.

Next, the advantages of the node 100 according to this embodiment will be described. The node 100 registers the control header information of the hello packet in the work table 140a, when the node 100 receives the hello packet. The control header information of the hello packet includes the plurality of sets of the address, the destination, and ΣPav of the node. The node 100 stores information, which is obtained by adding a set of the address, the destination, and ΣPav of the own node from the own node to the destination, in the control header of the hello packet and transmits the hello packet. When these processes are performed by each node included in the ad-hoc network, the GW 1 which is the destination can efficiently collect the information on the number of hops, the link RSSI, and the topology. Further, since each node 100 does not separately transmit operational data, the bandwidth can be saved.

When the node 100 receives the hello packet, the node 100 determines whether predetermined condition (1) is satisfied based on the control header information of the hello packet and the communication path table 140b. When predetermined condition (1) is satisfied, the node 100 stores the control header information in the work table 140a. Therefore, only when the own node is included in a path from the node of the transmitting source to the destination, the set of the address, the destination, and ΣPav of the node can be added to the control header of the hello packet. As a result, the GW 1 can accurately obtain the information on the topology or the like.

Figure 15:
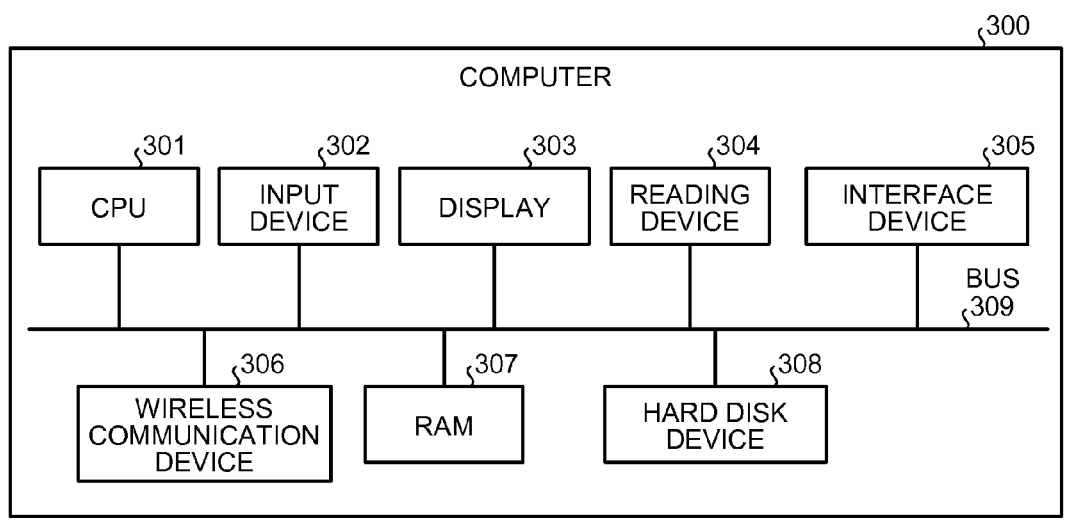
FIG. 15 is a diagram illustrating a hardware configuration of a computer configured as a node according to the embodiment.
Figure 16:
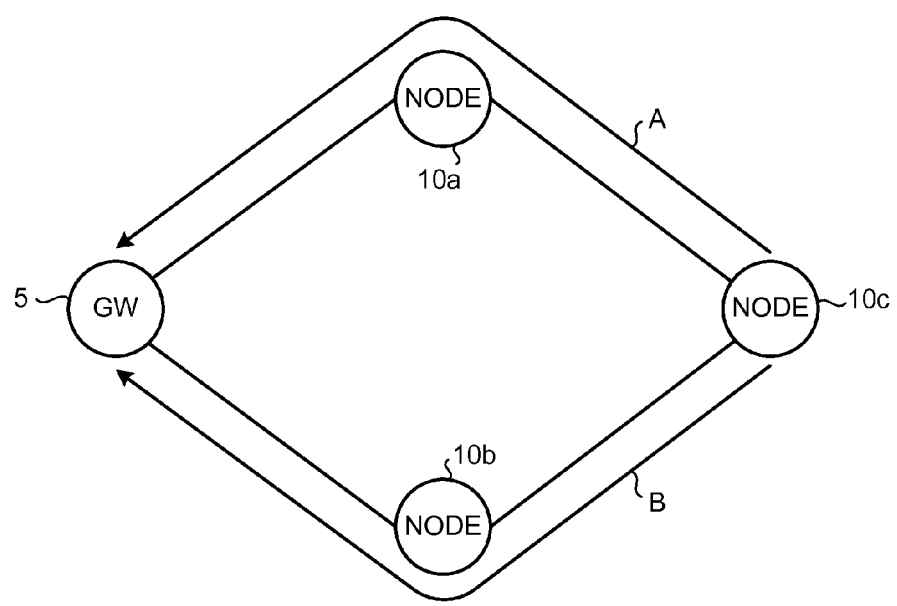
FIG. 16 is a diagram illustrating an example of a technology of the related art.

The functions of the node 100 described above in the embodiment can be also realized by mounting the functions corresponding to the nodes on an information processing apparatus such as existing personal computers (PC) or personal digital assistants (PDA). FIG. 15 is a diagram illustrating a hardware configuration of a computer configured as the node according to the embodiment.

As illustrated in FIG. 15, a computer 300 includes a CPU 301 that executes various kinds of arithmetic processes, an input device 302 that receives data input from a user, and a display 303. The computer 300 further includes a reading device 304 that reads a program or the like from a storage medium and an interface device 305 that is connected to another apparatus. The computer 300 further includes a wireless communication device 306 that is wirelessly connected with another apparatus, a RAM 307 that temporarily stores various kinds of information, and a hard disk device 308. The devices 301 to 308 are connected to a bus 309.

The hard disk device 308 stores various programs such as a receiving program and a transmitting program.

The CPU 301 reads the programs stored in the hard disk device 308, develops the read programs on the RAM 307, and executes various processes. These programs can cause the computer to function as the receiving unit 150a, the path determining unit 150b, the changing unit 150c, and the transmitting unit 150d in FIG. 4.

The programs are not necessarily stored in the hard disk device 308. For example, a program stored in a storage medium such as a CD-ROM may be read and executed by the computer 300. Further, each program may be stored in a storage device connected to a public circuit line, the Internet, a local area network (LAN), a wide area network (WAN), or the like. In this case, the computer 300 may read each program from the storage device and execute the read program.

According to the aspect of the invention, it is possible to obtain the advantage of efficiently collecting the information used to construct the paths.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A wireless communication apparatus comprising:
a memory that stores a path information table in which a destination and a sum value of signal intensities from the wireless communication apparatus to the destination correspond to each other; and
a processor coupled to the memory, wherein the processor executes a process comprising:
receiving a first packet, transmitted from a downstream node, in which an information on the downstream node included in a multi-hop network and a sum value of signal intensities from the downstream node to the destination are sequentially stored for each downstream node; and
transmitting a second packet to an upstream node to the destination based on the path information table, the second packet being a packet in which an information on the wireless communication apparatus and a sum value of the signal intensities from the wireless communication apparatus to the destination is are added to the information on the downstream node and the sum value of the signal intensities from the downstream node to the destination, the information on the downstream node and the sum value of the signal intensities from the downstream node to the destination being sequentially stored for each downstream node.

2. The wireless communication apparatus according to claim 1, wherein, the receiving includes storing an information on the downstream node and a sum value of the signal intensities from the downstream node to the destination in the memory, the information on the downstream node and the sum value of the signal intensities from the downstream node to the destination being sequentially stored for each downstream node included in the first packet, when the first packet is received and a sum value of the signal intensities from an adjacent downstream node included in the first packet to the destination is identical with an added value of the sum value of the signal intensities from the wireless communication apparatus to the destination and a signal intensity between the wireless communication apparatus and the adjacent downstream node, and the transmitting includes transmitting the second packet which is obtained by adding the information on the wireless communication apparatus and the sum value of the signal intensities from the wireless communication apparatus to the destination to the information on the downstream node and the sum value of the signal intensities from the downstream node to the destination, the information on the downstream node and the sum value of the signal intensities from the downstream node to the destination being sequentially stored for each downstream node in the memory.

3. A non-transitory computer-readable recording medium having stored therein a program for causing a computer to execute a wireless communication process comprising:
  receiving a first packet, transmitted from a downstream node, in which ann information on the downstream node included in a multi-hop network and a sum value of signal intensities from the downstream node to a destination is are sequentially stored for each downstream node; and
  transmitting a second packet to an upstream node to the destination based on a path information table in which the destination and the sum value of the signal intensities from the computer to the destination correspond to each other, the second packet being a packet in which an information on the computer and a sum value of signal intensities from the computer to the destination are added to the information on the downstream node and the sum of value of the signal intensities from the downstream node to the destination, the information on the downstream node and the sum value of the signal intensities from the downstream node to the destination being sequentially stored for each downstream node.

4. The non-transitory computer-readable recording medium according to claim 3, wherein the receiving includes storing an information on of the downstream node and a the sum value of the signal intensities from the downstream node to the destination in a memory, the information on the downstream node and the sum value of the signal intensities from the downstream node to the destination being sequentially stored for each downstream node included in the first packet, when the first packet is received and a sum value of signal intensities from an adjacent downstream node included in the first packet to the destination is identical with an added value of the sum value of the signal intensities from the computer to the destination and a signal intensity between the computer and the adjacent downstream node, and the transmitting includes transmitting a the second packet which is obtained by adding the information on the computer and the sum value of the signal intensities from the computer to the destination to the information on the downstream node and the sum value of the signal intensities from the downstream node to the destination, the information on the downstream node and the sum value of the signal intensities from the downstream node to the destination being sequentially stored for each downstream node in the memory.

5. A wireless communication method performed by a computer, the method comprising:
  receiving a first packet, transmitted from a downstream node~in which ann information on the downstream node included in a multi-hop network and a sum value of signal intensities from the downstream node to a destination is are sequentially stored for each downstream node; and
  transmitting a second packet to an upstream node to the destination based on a path information table in which the destination and the sum value of the signal intensities from the computer to the destination correspond to each other, the second packet being a packet in which an information on the computer and a sum value of signal intensities from the computer to the destination are added to the information on the downstream node and the sum of value of the signal intensities from the downstream node to the destination, the information on the downstream node and the sum value of the signal intensities from the downstream node to the destination being sequentially stored for each node.

6. The wireless communication method according to claim 5, wherein the receiving includes storing an information on the downstream node and the sum value of the signal intensities from the downstream node to the destination in a memory, the information on the downstream node and the sum value of the signal intensities from the downstream node to the destination being sequentially stored for each downstream node included in the first packet, when the first packet is received and a sum value of signal intensities from an adjacent downstream node included in the first packet to the destination is identical with an added value of the sum value the signal intensities from the computer to the destination and a signal intensity between the computer and the adjacent downstream node, and the transmitting includes transmitting the second packet which is obtained by adding the information on the computer and the sum value of the signal intensities from the computer to the destination to the information on the downstream node and the sum value of the signal intensities from the downstream node to the destination, the information on the downstream node and the sum value of the signal intensities from the downstream node to the destination being sequentially stored for each downstream node in the memory.

* * * * *